United States Patent [19]
Johnson et al.

[11] Patent Number: 5,747,697
[45] Date of Patent: May 5, 1998

[54] VALVE STEM THRUST MEASURING DEVICE

[75] Inventors: William T. Johnson; Daniel J. Hare, both of Oswego, N.Y.

[73] Assignee: Niagara Mohawk Power Corporation, Syracuse, N.Y.

[21] Appl. No.: 732,974

[22] Filed: Oct. 16, 1996

[51] Int. Cl.$^6$ .................... G01B 15/30; G01L 1/00; G01N 3/00

[52] U.S. Cl. .................... 73/760; 73/767; 73/162; 73/862.621; 73/862.191

[58] Field of Search ............ 73/760, 767, 862.621, 73/862.191, 168

[56] References Cited

U.S. PATENT DOCUMENTS

| | | |
|---|---|---|
| 3,828,295 | 8/1974 | Bradley . |
| 4,543,837 | 10/1985 | Stern et al. . |
| 4,693,113 | 9/1987 | McNennamy et al. . |
| 4,882,937 | 11/1989 | Leon . |
| 5,090,239 | 2/1992 | Balaschak et al. . |
| 5,123,283 | 6/1992 | Duff et al. ............... 73/862.622 |
| 5,199,301 | 4/1993 | Bauer . |
| 5,220,843 | 6/1993 | Rak . |
| 5,257,535 | 11/1993 | Evans . |
| 5,347,871 | 9/1994 | D'Andrea et al. . |
| 5,469,737 | 11/1995 | Smith et al. . |
| 5,499,542 | 3/1996 | Morlan ............... 73/862.621 |
| 5,525,485 | 6/1996 | Bernard et al. ............... 73/862.191 |
| 5,546,817 | 8/1996 | Heiman ............... 73/862.333 |

*Primary Examiner*—Elizabeth L. Dougherty
*Assistant Examiner*—Max H. Noori
*Attorney, Agent, or Firm*—Wall Marjama & Bilinski

[57] ABSTRACT

A strain gage device that includes a split collar having a pair of hinged half sections arranged to close in pressure contact against a structural member bearing a strain inducing load. Each half section further contains a flexible ligament that is held in pressure contact against the member when the collar is closed. Strain gages are mounted on the back side of each ligament for sensing the amount of strain experienced by the structural member.

17 Claims, 2 Drawing Sheets

VALVE STEM THRUST MEASURING DEVICE

BACKGROUND OF THE INVENTION

This invention relates to a strain gage apparatus that can be removably mounted upon a structural member for sensing the amount of strain experienced along the axis of the member and, in particular, to a reusable strain gage apparatus for sensing the amount of strain in a valve stem.

In certain industries, such as the nuclear power generating industry, remote motor operated valves are located within hazardous, generally inaccessible regions. Access to these valves can only be gained during periods when the reactor is shut down for repairs or maintenance. For safety reasons, the amount of time a technician is permitted to remain within a hazardous area is limited, and it is therefore important valve testing be carried out as rapidly and efficiently as possible.

Typically, valve testing is conducted by mounting a sensor physically upon the valve body, calibrating the gage, and then cycling the valve through its entire stroke. A signature profile of the valve is thus generated from which actual or potential valve defects can be derived. Most present day gages are difficult to mount on the valve body and must be calibrated after mounting. Accordingly, the average time to conduct a test is extremely long, thus extending the down time. Reactor outages, even for short periods of time, are very costly so that any time that can be saved in testing valves represents a considerable savings.

The most widely employed device for testing remotely controlled valves located in a hazardous region of a nuclear facility is described in greater detail in U.S. Pat. No. 4,882,937 to Leon. As disclosed in the Leon patent, obtaining direct force measurements from the valve stem over the entire stroke of a valve is extremely difficult because of space constraints and problems involved in accurately and securely mounting the strain gages upon the stem. Leon, in an effort to overcome these difficulties mounts strain gages upon the yoke of the valve. Sensors are mounted longitudinally on the yoke and are connected into circuitry for generating voltage signals proportional to the strain experienced by the valve stem. The strain gages are initially mounted between clamping blocks and encapsulated within a rubber blanket to create a sensor unit. The unit is then mounted upon the yoke of the valve between a pair of precisely spaced posts that are secured to the yoke. The strain gages are then calibrated preparatory to taking any actual strain measurements. One means for achieving calibration is to secure a second strain sensor unit directly to the valve stem and establishing a relationship between the stem sensor and the yoke sensor under a given load. Once calibration is completed, the sensor is removed from the stem.

Although the Leon system works well in practice, a good deal of time must be expended in mounting and calibrating the gages. After a test is completed, the unit cannot be removed from the valve without damaging the gages. The gage therefore, cannot be used for further testing. Because the stress is being measured upon the yoke rather than the valve stem, the sensor readings can be adversely effected by vibrations or the like that are not directly related to the stress experienced by the valve stem. The Leon test apparatus thus takes a good deal of time to mount on the valve, can only be calibrated after mounting, is adversely effected by outside influences and results in the destruction of the expensive strain gages employed during testing.

In U.S. Pat. No. 5,347,871, there is disclosed a strain gage device that is suited for use in detecting strain experienced by a valve stem. The strain gages are contained in a flexible coupon that is mounted on the outer surface of a thin metal band. The band has sufficient flexibility so that it can be drawn tightly around a valve stem. A pair of raised clamping blocks are mounted upon the outer surface of the band at each end of the band. A special tool is used for engaging the blocks after the band has encircled the valve stem and applying pressure to the band to draw it into intimate pressure contact with the valve stem. Prior to tightening the band in place against the valve stem, the underlying valve stem surface is cleaned and prepared for an epoxy resin which, when set, securely bonds the band to the valve stem. Here again, the strain gages are difficult to mount in the field. The gages must be calibrated after mounting and the mounting blocks must be removed before testing to enable the valve to be cycled. The strain gages are also destroyed when the device is removed from the valve.

SUMMARY OF THE INVENTION

It is an object of the present invention to improve apparatus for sensing the strain experienced by a structural member.

It is a further object of the present invention to improve apparatus for measuring the strain experienced by the stem of a motor operated valve.

It is a still further object of the present invention to provide a strain gage device that can be rapidly and efficiently secured to the stem of a valve.

Yet a further object of the present invention is to provide a strain gage measuring device that can be reused in the testing of motor operated valves.

Another object of the present invention is to provide a reusable strain gage device that can be precalibrated prior to use and does not require recalibration between uses.

Yet another object of the present invention is to provide for the safety of workers that must test valves situated in hazardous areas.

Still another object of the present invention is to provide a removable and reusable strain gage device that can be quickly secured to the stem of a valve that does not interfere with the ability of the move through its entire stroke.

These and other objects of the present invention are attained by a strain gage apparatus for attachment to a structural member to sense the amount of strain experienced by the member along its axis. The apparatus includes a collar having a pair of coacting sections that are connected by a hinge so that the sections are able to close over the structural member. The collar also contains a central opening that complements the shape of the structural member and an adjustable clamping mechanism for securing the collar in place against the structural member. Raised contact pads are formed on the surface of the complementary opening that moves into pressure contact against the structural member when the collar is clamped in place. A pair of opposed flexible ligaments are also mounted upon the collar and are arranged to contact the structural member in pressure engagement when the collar is clamped in place. A strain gage unit is mounted upon the backside of each ligament which provides voltage signals that are indicative of the strain experienced by the member when it is placed under load.

As will be evident from the disclosure below, the apparatus of the present invention is ideally well suited for testing valves located in potentially hazardous regions. The collar is adaptable to be quickly place about the stem of a motor operated valve. The strain gages carried by the collars are pre-calibrated before the collar is secured to the valve thus considerably shortening the test period. Upon completion of the test, the collar can be easily removed from the valve stem without damaging the sensors.

BRIEF DESCRIPTION OF THE DRAWINGS

For a better understanding of these and other objects of the present invention, reference will be made to the following detailed description of the invention, which is to be read in association with the following drawings, wherein.

DESCRIPTION OF THE INVENTION

Figure 1:
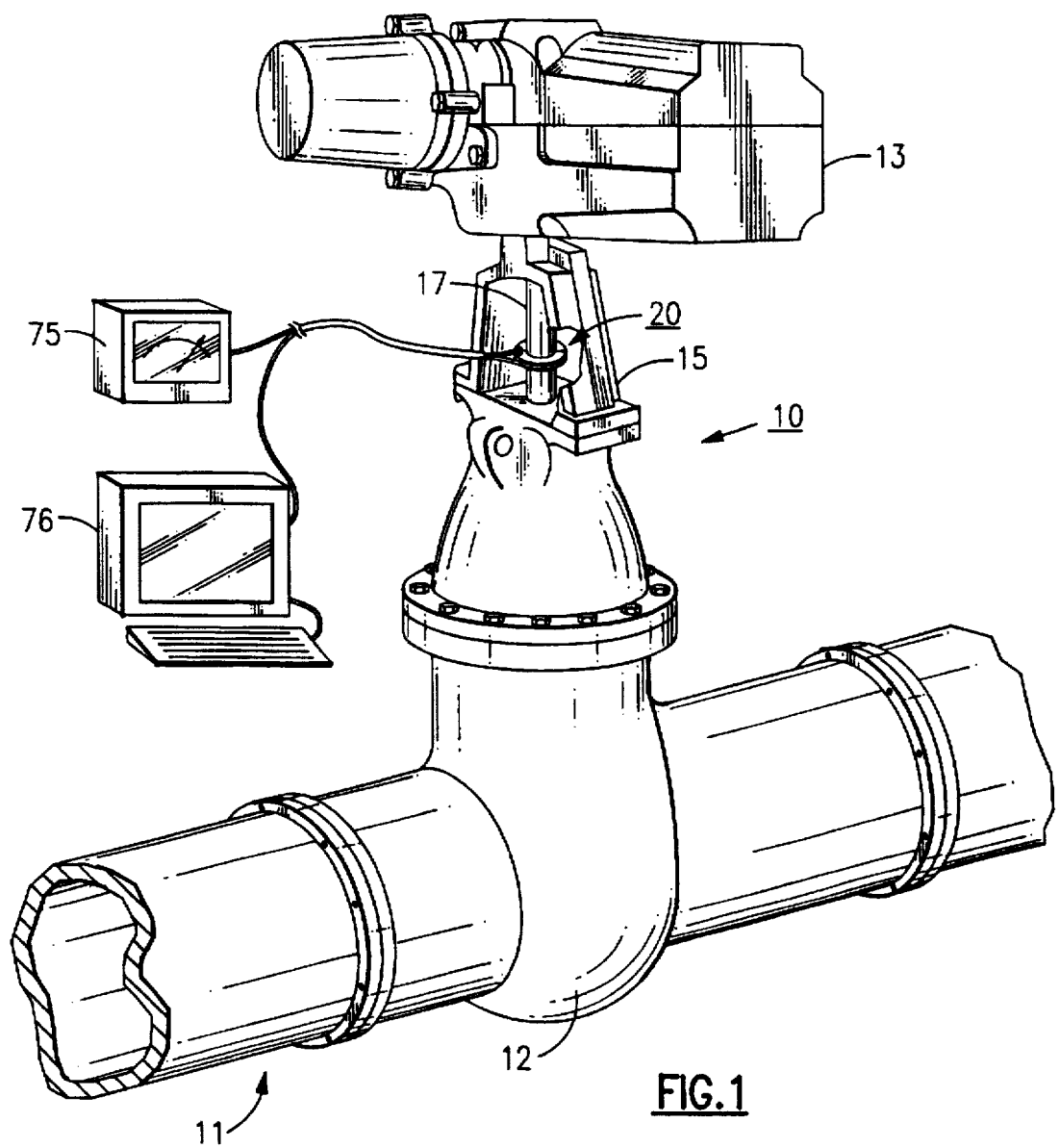
FIG. 1 is a perspective view showing a motor operated valve embodying the teachings of the present invention.

Turning initially to FIG. 1, there is illustrated a motor operated gate valve assembly, generally referenced 10, of well known construction that embodies the apparatus of the present invention. The valve is mounted within a pipe 11 through which a fluid flows. The term fluid as herein used is broad enough to include both liquid and gases. The assembly includes a valve body 12 and motor unit 13 that is supported over the valve body upon a yoke 15. The motor unit contains a gear system that is coupled to the valve stem 17 and arranged to turn the valve stem in either a clockwise or counter-clockwise direction to open or close a valve with regard to a valve seat, and thus control the flow of fluid through pipe 11. The valve is arranged to move between a seated position wherein flow through the pipe is blocked and a back seated or filly open position wherein fluid flows through the pipe in an unrestricted manner.

Motor operated valves are well known in the art, and are widely used in the nuclear industry to control the flow of cooling water through a nuclear reactor. The valves are typically located in hazardous areas that are only accessible during periods when the reactor is shut down for periodic maintenance or repairs. Testing of the motor operated valves must therefore be carried out during these shut down periods. An average test of a single valve using presently available devices takes in excess of eight hours to complete. Much of this time is consumed in properly mounting strain gages on the valve structure which requires preparation of the mounting surface and bonding the gage or gages to the prepared surface using a curable adhesive or the like. After the gages are properly affixed to the valve structure, lead wires must be coupled to the gages and brought out to the monitoring and recording equipment. Lastly, each gage must be calibrated in situ by measuring its output voltage while mechanically imparting known forces to the valve.

Preferably, the strain gages are mounted upon the valve stem so that a direct indication of the amount of strain that is experienced by the valve is obtained as the valve is stroked between the fully opened and fully closed position. As noted in the above mentioned Leon patent, the strain gages, when mounted on the stem of motor operated valves, typically prevent the valve from moving through a complete stroke. Although Leon overcomes this problem by mounting his gages upon the valve yoke, unwanted outside forces such as vibrations and the like can cause erroneous gage reading and thus adversely effect the test results.

In any event, the presently accepted apparatus for conducting strain tests on motor operated valves is difficult to carry out and consumes a rather good deal of time to conduct. In the case of a nuclear facility, this causes unwanted exposure to potentially harmful radiation for those conducting the test and considerably extends the reactor's down time. In addition, the costly strain gages that are bonded to the valve structure are destroyed upon removal, thus further increasing the cost of testing.

As will become evident from the disclosure below, the present invention involves a strain gage sensing device 20, which can be rapidly and easily mounted upon and removed from the stem 17 of a motor operated valve without harming the strain gages in any way. Accordingly, the relatively expensive gages can be reused in conducting further tests. The device is relatively small in size and takes up little space when secured to a valve stem. Because the device occupies little space, the valve can be cycled through a complete stroke thus permitting the operator to obtain the valve signature from which valuable data concerning the valve's present and future operability can be gained. The device can be pre-calibrated prior to use and does not require special preparation of the valve stem.

Figure 2:
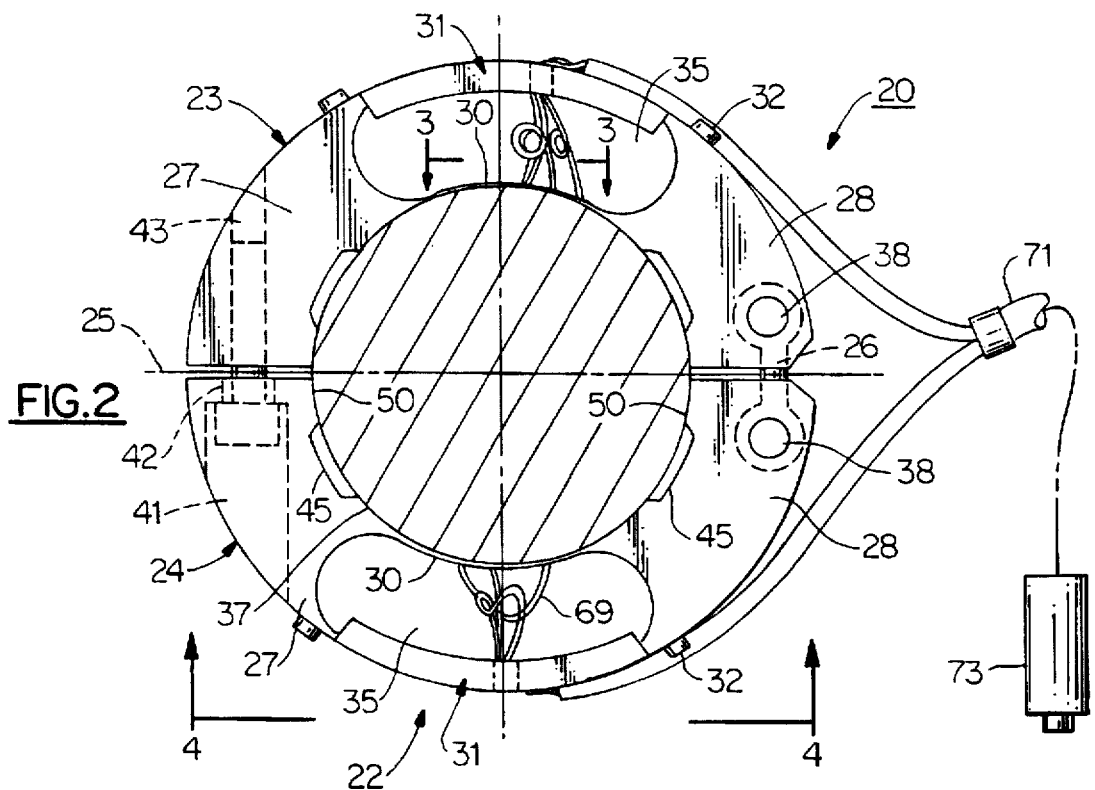
FIG. 2 is an enlarged top view of the hinged collar containing the strain gages for sensing the strain experienced by a structural member and providing a voltage signal indicative of the amount of strain.
Figure 3:
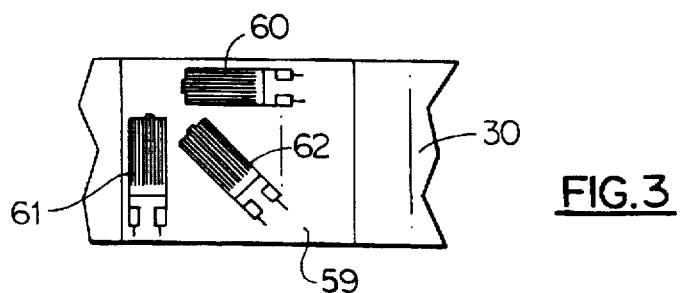
FIG. 3 is a view taken at 3—3 in FIG. 2.
Figure 4:
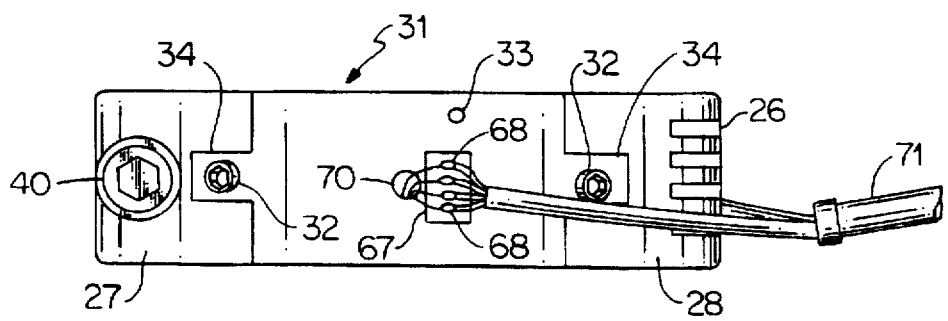
FIG. 4 is an enlarged partial view of the strain gages utilized in the present invention.

The strain sensing device of the present invention is shown in greater detail in FIGS. 2–4. The device includes an annular two-piece collar 22 having symmetrical half-sections 23 and 24 that are hinged together by a hinge 26 so that the half-sections can open and close about a common axis 25. Each half-section contains a pair of end pieces 27 and 28 that are connected by a thin flexible ligament 30. Preferably, the two end pieces and the connecting ligament are integrally formed from a single piece of metal which is preferably low carbon steel or any other metal having similar properties.

An arcuate shaped stiffening member 31 extends between end pieces of each half section and is secured to the end pieces by fasteners such as screws 32—32. The stiffening members are formed of a high strength plastic and include a body section 33 that has a width about equal to that of the end pieces and a pair of opposed centrally located tabs 34—34. The tabs extend outwardly from each end of the stiffening member and are arranged to seat in recesses provided in the end pieces 27 and 28. The mounting screws 32—32 pass downwardly through the tabs and are threaded into the end pieces to securely join the end pieces in assembly. A slotted hole or gap 35 is provided in assembly between the ligament and the stiffening member.

The end pieces 27—27 of the two half-sections are pivotally joined by means of a hinge 26 that is secured in the end pieces by means of dowel pins 38—38. The hinge sections and the dowel pins are formed of a hardened steel which prevents the hinge from deforming when the half-sections of the collar are brought into pressure contact against a valve stem. The other two end pieces of the two half-sections are joined by a removable cap screw 40. A recess 41 and clearance hole 42 are provided in one of the end pieces and a thread hole 43 is machined in the opposite end piece. As shown in FIG. 2, the threaded shank of the cap screw is passed through the clearance hole and threaded into the opposing end piece. Threading the cap screw into the threaded hole causes the head of the cap screw to bottom in the recess and thus pulls the two half sections together.

Accordingly, the cap screw can be adjusted to bring the half sections into pressure contact with the valve stem.

The half sections are formed so that a circular opening 37 is created when the half-sections of the collar are brought to closure. A pair of recesses 45—45 are machined in the inside wall of each half section between the ligament and the end faces of the sections to create mounting pads 50—50. The opening in the collar forms a complete circle when the half sections are brought to a predetermined position. The radial distance of the pads and the ligaments from the center of the circle are thus all equal. This radial distance is slightly less than the radius of the valve stem 17 of the valve being tested. Accordingly, when the collar is closed about the valve stem, the mounting pads and the ligaments can be placed in pressure contact against the stem by use of the adjusting screw 40.

As illustrated in FIG. 3, a strain gage coupon 59 is bonded to the back side of each ligament. The coupons are protectively housed within the gaps 35—35 between the ligaments and the stiffening member. Each coupon 59, in this embodiment of the invention, contains three sensors 60–62. A first sensor 60 is arranged to detect the deformation produced in the valve stem due to a bending load. A second sensor 61 is similarly arranged to detect the deformation produced by an axial load, and a third sensor 62 is arranged to detect, the angular deformation produced by a torsional load. Coupons containing one or more strain gages encapsulated therein suitable for use in the present strain sensing device are commercially available through a number of different suppliers. The coupons are mounted upon the ligament so that the sensors are generally opposite to one another when the collar is closed about a valve stem. As is well known in the art, the sensors are wired into bridge circuits so that the bending forces exerted upon the opposed ligaments are canceled out and the axial and torsional forces are read out as a voltage signal. The amount of change in voltage is thus indicative of the amount of change in loading.

Because of the unique design of the present device, the sensors can be precalibrated prior to use and the device given a sensitivity rating whereby output readings can be easily corrected to provide extremely accurate output data over the stroke of the valve.

With further reference to FIG. 4, a terminal board 67 is mounted on the outer surface of each stiffening member. The board contains a series of bonding pads 68–68. The leads 69 from the strain gage sensors are brought out of the gap region over each ligament via a hole 70 in the stiffening member and are connected to the terminal bonding pads. A wire harness 71 containing output leads is also connected to the pads. The other end of the harness is attached to a pin connector 73. A monitor 75 (FIG. 1) is electrically coupled to the harness through means of the connector. The monitor contains circuitry for converting the voltage readout information to strain readings that are displayed in the window of the monitor. The display also indicates the polarity of the voltage signal further indicating whether the valve stem is experiencing a compressive or tensile load. Additionally, the readout data from the sensor is fed to a computer 76 for further processing of the readout data for diagnosing various problems associated with the valve as it is cycled through an entire stroke.

Although the present invention was described with reference to a motor operated valve having a cylindrical valve stem, the apparatus of the present invention is well suited for use in association with any type of structural member that is subjected to strain inducing loads.

While this invention has been explained with reference to the structure disclosed herein, it is not confined to the details set forth and this invention is intended to cover any modifications and changes as may come within the scope of the following claims:

What is claimed is:

1. A strain apparatus for detecting stress experienced by a structural member that includes
    a support collar having a pair of coacting half sections that are connected by a hinge means so that the half sections can close about a structural member,
    said support collar further including a central opening that complements the cross sectional shape of the structural member, and a closure means for securing the half sections in pressure contact against the structural member,
    a pair of spaced apart contact pads located along the central opening portion of each half section that are arranged to contact the structural member in pressure engagement when the half sections are closed about the structural member,
    a thin flexible ligament mounted upon each half section between the spaced apart contact pads that is arranged to contact the structural member in pressure engagement along with the contact pads when the half sections are closed about the structural member:
    a strain gage coupon mounted upon each ligament having strain gage means whereby any change in the structural member geometry is applied directly to said strain gage means, and
    said contact pads and said ligaments being integral with the half sections.

2. The apparatus of claim 1 wherein said coacting half sections of said collar are symmetrical half sections and the ligaments are mounted in opposition upon the collar.

3. The apparatus of claim 2 wherein each half section further includes two end pieces that are integrally connected by one of said ligaments.

4. The apparatus of claim 3 wherein each half section further includes a rigid stiffening member securely connected to each end piece over said ligament to provide a gap between said stiffening member and said ligament.

5. A strain apparatus for attachment to a cylindrical valve stem for measuring the stress experienced by the stem, said apparatus including,
    a split annular collar having a pair of coacting half sections that are connected by a hinge means so that the sections can open and close about a cylindrical valve stem, said collar having a circular opening that compliments the cross section of the valve stem and an adjustable closure means for closing the half sections about the valve stem in pressure contact therewith,
    a pair of spaced apart contact pads having arcuate shaped contact surfaces having a predetermined radius of curvature said contact pads being located upon the central opening of each half section and arranged to contact said valve stem in pressure engagement when the half sections are closed about the valve stem,
    a thin arcuate shaped ligament mounted upon each half section between the spaced apart pads, said ligament having an arcuate shaped contact surface having a radius of curvature substantially equal to that of the contact surfaces of said pads and being arranged to contact the valve stem in pressure contact when the pads are in pressure contact with the valve stem,
    a strain gage coupon mounted upon the back of each ligament having strain gage means for sensing the strain induced in said the ligament as the valve stem changes geometry, and wherein said ligaments are integral with the half sections.

6. The apparatus of claim 4 wherein a strain gage coupon is mounted upon the back side of each ligament within said gap.

7. The apparatus of claim 6 that further includes a terminal means mounted upon said stiffening means that is electrically coupled to said strain gage means and circuit means for measuring the amount of strain experienced by said structural member.

8. The apparatus of claim 7 wherein said strain gage means contains sensing elements for sensing tension, compression and torsion experienced by said structural element.

9. The apparatus of claim 7 wherein each stiffener is formed of a non-conducting material.

10. The apparatus of claim 1 wherein said ligaments and said end pieces are formed of metal.

11. The apparatus of claim 1 wherein said closure means further includes a threaded fastener for removably connecting the two coacting collar sections.

12. The apparatus of claim 5 wherein each half section includes two end pieces that are connected by one of said ligaments, and each of said contact pads being integral with one of said end pieces.

13. The apparatus of claim 5 that further includes an arcuate shaped rigid stiffener mounted over each ligament to form a chamber behind said ligament in which one of said strain gage coupons is mounted.

14. The apparatus of claim 13 wherein each stiffener is secured to each end piece of the half section.

15. The apparatus of claim 5 that further includes circuit means connected said strain gage means for measuring the amount of strain experienced by said valve stem.

16. The apparatus of claim 15 wherein each stiffener means is formed of a rigid non-conducting material and further includes terminal means mounted on each stiffener that is electrically coupled to a strain gage means and said circuit means.

17. The apparatus of claim 15 wherein said strain gage means is capable of measuring compression, tension and torsion.

\* \* \* \* \*